(No Model.)

P. F. RACHAL.
VEHICLE HUB.

No. 495,707. Patented Apr. 18, 1893.

Witnesses
C. A. Ford
N. T. Riley

Inventor
Paul F. Rachal.
By his Attorneys,
C. A. Snow & Co.

UNITED STATES PATENT OFFICE.

PAUL FIRMIN RACHAL, OF FORT JESUP, LOUISIANA.

VEHICLE-HUB.

SPECIFICATION forming part of Letters Patent No. 495,707, dated April 18, 1893.

Application filed January 16, 1893. Serial No. 458,510. (No model.)

*To all whom it may concern:*

Be it known that I, PAUL FIRMIN RACHAL, a citizen of the United States, residing at Fort Jesup, in the parish of Sabine and State of Louisiana, have invented a new and useful Hub, of which the following is a specification.

The invention relates to improvements in hubs.

The object of the present invention is to simplify and improve the construction of hubs, to enable the spokes to be readily clamped in place and to be removed when worn without necessitating the removal of the tire, and to facilitate the removal of the axle box to permit an old one to be readily replaced by a new one.

The invention consists in the construction and novel combination and arrangement of parts hereinafter fully described, illustrated in the accompanying drawings and pointed out in the claims hereto appended.

Figure 1:
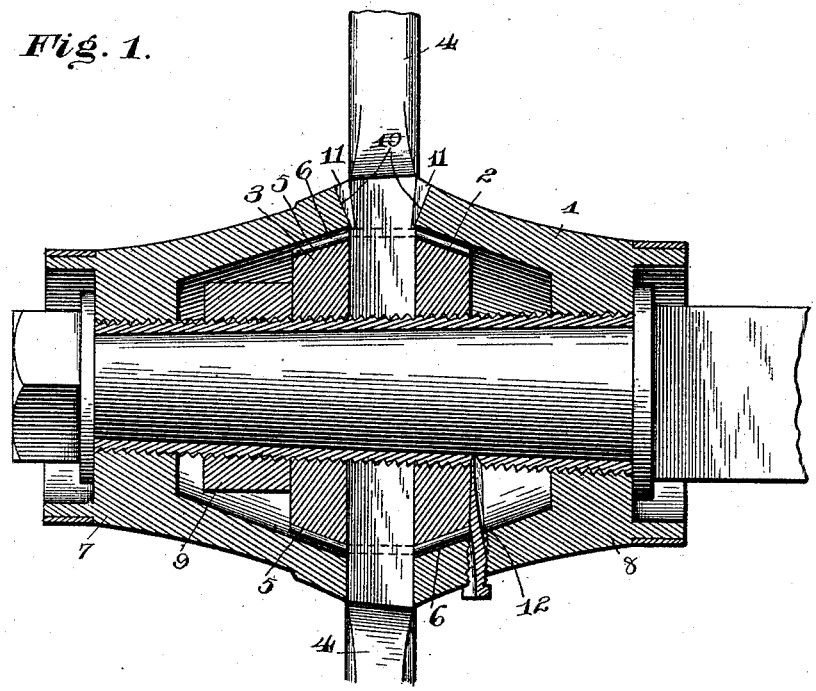
Figure 2:
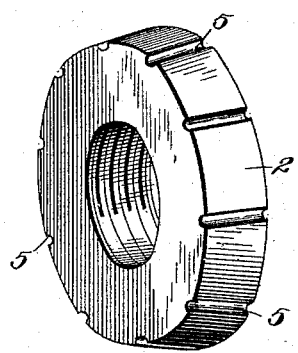
Figure 3:
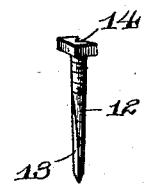

In the drawings—Figure 1 is a longitudinal sectional view of a hub constructed in accordance with this invention. Fig. 2 is a detail perspective view of one of the spoke securing rings. Fig. 3 is a similar view of the pin.

Like numerals of reference indicate corresponding parts in all the figures of the drawings.

1 designates a detachable axle box exteriorly screw threaded and tapering to conform to the configuration of the spindle of an axle, and having arranged on it midway between its ends a pair of spoke securing rings 2 and 3, which are interiorly threaded to screw on the axle box. The spoke securing rings, between which spokes 4 have their inner ends wedged, are circumferentially beveled and are provided at their beveled peripheries with annular series of grooves 5, which receive the end portions of pins 6 extending laterally from opposite sides of the spokes. The pins are passed through the spokes and are clamped in the grooves of the securing rings by tapering end caps 7 and 8, which form the exterior of the hubs and are hollowed out at their inner ends to fit over these securing rings 2 and 3. The end caps 7 and 8 are interiorly threaded at their outer ends to screw on the axle box, and they provide an interior oil space for supplying a suitable lubricant to the spindle of an axle. The spokes are securely clamped in the hub, and may be readily removed without necessitating the removal of a tire of a wheel; and the axle box is also readily detachable.

In order to fasten the spokes more securely and strengthen the construction, the concavity at the inner end of the outer cap is enlarged and a nut 9 is screwed on the axle box against the adjacent ring 3. Each end cap is provided at its inner edge with a slot 10 adapted for the reception of a wedge 11, which is driven into the adjacent spoke, whereby the end caps are held against accidental unscrewing.

In order to control the flow of oil to the spindle of an axle a threaded pin 12 is arranged in a threaded opening of the inner cap 7 and in a perforation of the axle box; the pin is arranged adjacent to the securing ring; and it is provided in its lower portion with a longitudinal groove 13 and in its upper portion with a recess or a notch 14. When the pin is turned to bring the groove or the recess to face the annular cavity of the end cap, the lubricant is either permitted to flow to the interior of the axle box, or the cavity may be supplied with oil through the notch or recess; and when either the groove or recess is arranged against the adjacent securing ring the latter is adapted to close it.

It will be seen that the hub is simple and comparatively inexpensive in construction, that it enables spokes to be firmly and quickly clamped in position, and that the spindle of an axle may be readily lubricated.

Changes in the form, proportion and the minor details of construction may be resorted to without departing from the principle or sacrificing any of the advantages of this invention.

What I claim is—

1. In a hub, the combination of an exteriorly threaded axle box, a pair of spoke securing rings interiorly threaded and arranged on the axle box, spokes arranged between the rings, a nut arranged on the axle box and located adjacent to one of the rings, and the end caps screwed on the axle box and having concavities at their inner ends receiving the nut and the securing rings, substantially as described.

2. In a hub, the combination of an axle, a pair of spoke securing rings provided on their peripheries with annular series of transverse grooves, spokes located between the rings and provided with laterally extending pins arranged in said grooves, and the end caps fitting over the rings and securing the pins in the grooves, substantially as described.

3. In a hub, the combination of an exteriorly threaded axle box, a pair of spoke securing rings interiorly threaded and arranged on the axle box, spokes arranged between the rings, the end caps interiorly threaded and screwed on the axle box and provided at their inner ends with concavities to receive the securing rings and having at their inner edges slots, and wedges arranged in the slots and engaging the spokes to prevent the end caps unscrewing, substantially as described.

4. In a hub, the combination of an exteriorly threaded axle box, a pair of spoke securing rings arranged on the axle box, spokes arranged between the rings, the end caps having concavities in their inner ends adapted to form an oil chamber, and a pin mounted in one of the end caps and the axle box and provided in its lower portion with a groove and its upper portion with a recess, and located contiguous to one of the rings, substantially as and for the purpose described.

In testimony that I claim the foregoing as my own I have hereto affixed my signature in the presence of two witnesses.

PAUL FIRMIN RACHAL.

Witnesses:
W. E. McNEELY,
M. F. WEBB.